(12) United States Patent
Reijersen Van Buuren

(10) Patent No.: US 9,609,809 B2
(45) Date of Patent: Apr. 4, 2017

(54) WRAPPING DEVICE

(71) Applicant: LELY PATENT N.V., Maassluis (NL)

(72) Inventor: Willem Jacobus Reijersen Van Buuren, Dirksland (NL)

(73) Assignee: LELY PATENT N.V., Maassluis (NL)

( * ) Notice: Subject to any disclaimer, the term of this patent is extended or adjusted under 35 U.S.C. 154(b) by 665 days.

(21) Appl. No.: 14/010,588

(22) Filed: Aug. 27, 2013

(65) Prior Publication Data

US 2013/0340386 A1     Dec. 26, 2013

Related U.S. Application Data

(63) Continuation of application No. 13/303,249, filed on Nov. 23, 2011, now Pat. No. 8,544,241, which is a continuation of application No. PCT/NL2010/000077, filed on May 7, 2010.

(30) Foreign Application Priority Data

May 29, 2009 (NL) .................... 1037002

(51) Int. Cl.
*A01F 15/07* (2006.01)

(52) U.S. Cl.
CPC ........ *A01F 15/071* (2013.01); *A01F 15/0715* (2013.01); *A01F 2015/076* (2013.01); *A01F 2015/0735* (2013.01)

(58) Field of Classification Search
CPC ............................ A01F 15/071; A01F 15/0715
See application file for complete search history.

(56) References Cited

U.S. PATENT DOCUMENTS

| | | | |
|---|---|---|---|
| 4,685,270 A | 8/1987 | Brambilla | |
| 4,827,700 A | 5/1989 | Rampe et al. | |
| 5,042,225 A | 8/1991 | Drury et al. | |
| 5,365,723 A | 11/1994 | Ramos | |
| 5,487,255 A | 1/1996 | Söderberg | |

(Continued)

FOREIGN PATENT DOCUMENTS

| | | |
|---|---|---|
| DE | 9414220 U1 | 1/1995 |
| DE | 10334681 B3 | 4/2005 |

(Continued)

OTHER PUBLICATIONS

International Search Report of PCT/NL2010/000077 issued Jul. 27, 2010.

*Primary Examiner* — Christopher Harmon
(74) *Attorney, Agent, or Firm* — Hoyng Rokh Monegier LLP; Ramin Amirsehhi; David P. Owen

(57) ABSTRACT

The invention relates to a wrapping device for enveloping or packing in particular agricultural crop bales, including a wrapping floor for receiving and rotating the pressed crop bale and a guide frame for at least one wrapping material carrier for wrapping the bale on the wrapping floor with wrapping material in the form of webs, wherein the guide frame is height adjustable, in order to set the center of the wrapping material approximately at the location of the center of the crop bale to be wrapped. In order to be able to adapt wrapping devices having a guide frame to bales of different bale diameters, the guide frame should be pivotable about a horizontal axle which is situated parallel to the axis of rotation of the crop bale.

20 Claims, 6 Drawing Sheets

(56) References Cited

U.S. PATENT DOCUMENTS

| | | | |
|---|---|---|---|
| 5,822,967 A * | 10/1998 | Hood | A01F 15/071 100/5 |
| 5,996,307 A | 12/1999 | Niemerg et al. | |
| 6,247,291 B1 | 6/2001 | Underhill | |
| 6,722,110 B1 * | 4/2004 | Royneberg | A01F 15/071 100/15 |
| 6,857,251 B2 | 2/2005 | McClure et al. | |
| 8,028,499 B2 | 10/2011 | Viaud | |
| 2003/0070392 A1 | 4/2003 | Lacey | |
| 2003/0089081 A1 * | 5/2003 | Platon | A01F 15/071 53/399 |
| 2009/0107349 A1 * | 4/2009 | Noonan | A01F 15/071 100/14 |
| 2012/0210886 A1 * | 8/2012 | Reijersen Van Buuren | A01F 15/071 100/7 |

FOREIGN PATENT DOCUMENTS

| | | |
|---|---|---|
| EP | 1285571 | 5/2007 |
| EP | 2050330 A1 | 4/2009 |
| GB | 2188587 A | 10/1987 |

\* cited by examiner

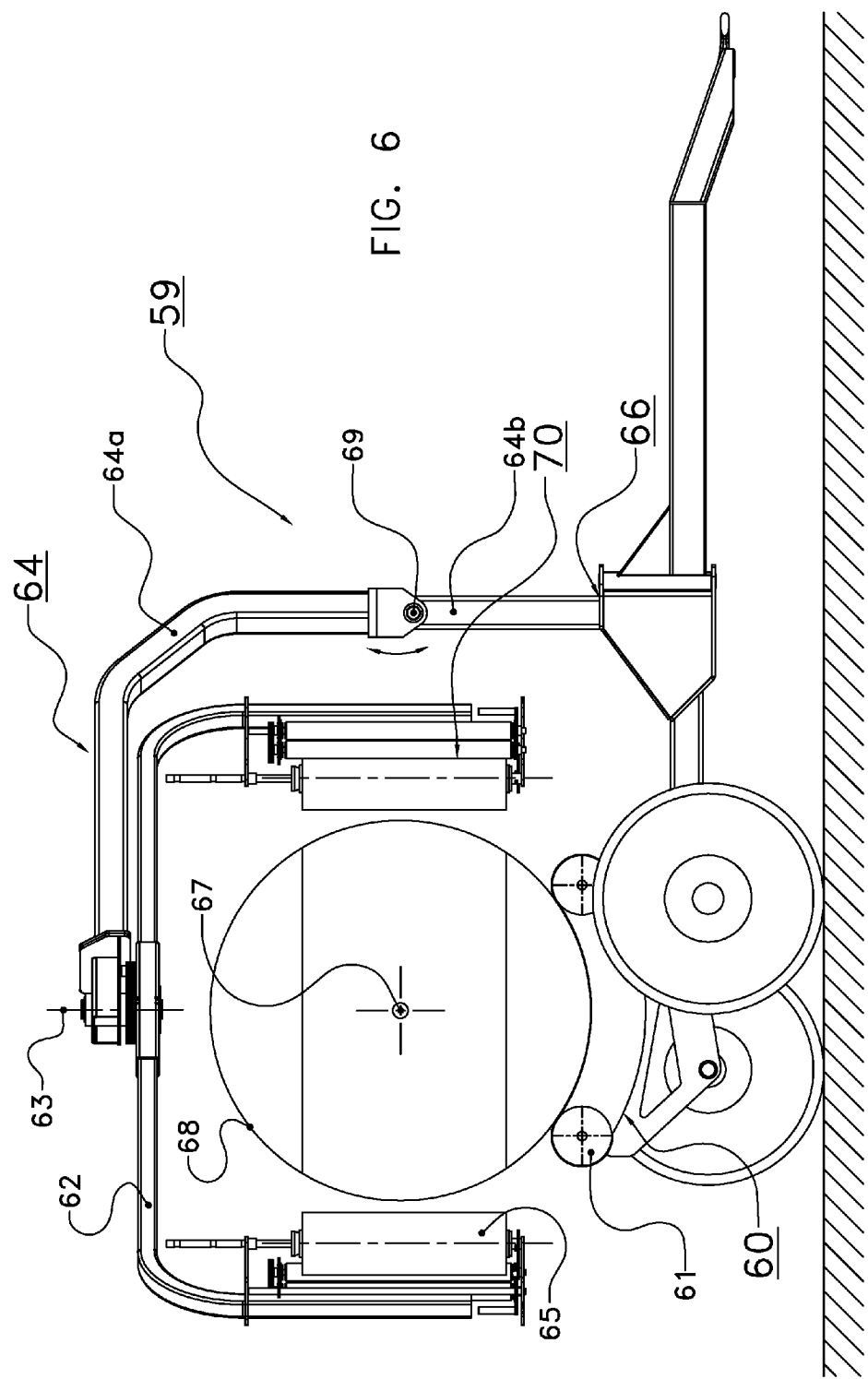

WRAPPING DEVICE

CROSS REFERENCE TO RELATED APPLICATIONS

This application is a continuation U.S. application Ser. No. 13/303,249, filed on 23 Nov. 2011, which is a continuation of PCT application number PCT/NL2010/000077 filed on 7 May 2010, which claims priority from Netherlands application number 1037002 filed on 29 May 2009. The above applications are hereby incorporated by reference in their entireties.

BACKGROUND OF THE INVENTION

1. Field of the Invention

The invention relates to a wrapping device for enveloping or packaging in particular agricultural crop bales.

2. Description of the Related Art

Known wrapping devices are described in EP 2 050 330 A1 and DE 94 14 220 U1, both of which are hereby incorporated by reference in their entireties. In order for a bale to be wrapped in webs of wrapping material, for example film/foil webs, the wrapping material carriers have to be guided centrally around the bale at the location of the cylinder axis of the bale. In order to ensure this in the case of bales of different diameters, the guide frame for the wrapping material carrier is arranged here in such a manner that it can, by means of a height-adjustment device, be adjusted in height in a straight line along a frame in the vertical direction and at right angles to the wrapping floor. By means of these known devices, it is possible, in principle, to produce bales which have been wrapped according to the same quality standards.

In addition to the relatively complicated structure of the translational sliding movement, the known devices have the considerable drawback that they, in combination with a bale press, require a large amount of construction space, both with regard to the length of the machine and also with regard to the height. Another drawback is that functions for the translational height adjustment which are already present cannot be used. A desired, space-saving transport position for the guide frame can only be achieved with considerable additional expenditure.

In another known embodiment DE 103 34 681 B3, which is hereby incorporated by reference in its entirety, the entire wrapping table with the crop bale situated thereon can be lifted or lowered to a position in which the wrapping material can be taken centrally around the crop bale. The relatively complicated lifting or lowering mechanism for moving large masses of approximately 1200 to 1600 kg and for keeping the wrapping table with the crop bale situated thereon stable at the set height during wrapping is a drawback.

EP 1 285 571 A1, which is hereby incorporated by reference in its entirety, discloses a device for pressing and enveloping round bales, comprising a bale press with variable press chamber for producing bales of different diameters and a horizontal, oval guide frame for the wrapping material to rotate along. The guide frame encloses the round bale in such a manner that it can be wrapped in the press chamber without having to deliver it beforehand for the wrapping procedure. This device has the drawback that no device is provided for the vertical positioning of the wrapping material for different bale diameters, as a result of which it is not possible to achieve a uniform wrapping of the bales. In order to be able to unload the bale, the guide frame can be pivoted about the vehicle axle which is situated below the press chamber. An additional translational vertical displacement of the guide frame according to EP 2 050 330 A1 and DE 94 14 220 U1 is neither achievable on the basis of its function, nor of its expenditure. The teaching according to DE 103 34 681 B3 cannot be transferred. On the one hand, the press chamber floor has drivable press elements, on the other hand, half the press chamber floor has to be folded down in order to unload the finished bale, so that there is no space for further lifting or lowering mechanisms. Basically, this device has the drawback that no round bale can be pressed during the wrapping procedure.

Further wrapping devices are known from GB 2 188 587 A and U.S. Pat. No. 4,685,270 A, which are hereby incorporated by reference in their entireties.

BRIEF SUMMARY OF THE INVENTION

The present invention aims to improve previous wrapping devices and to develop a simple solution in particular for wrapping devices having a guide frame for the wrapping material.

According to various aspects of the present invention, a wrapping device for enveloping or packing in particular agricultural crop bales, comprises a wrapping floor for receiving and rotating the pressed crop bale and a guide frame for at least one wrapping material carrier for enveloping the bale situated on the wrapping floor with wrapping material in the form of webs, wherein the guide frame is height adjustable and pivotable about a horizontal axle which runs parallel to the axis of rotation of the crop bale, in order to set the center of the wrapping material approximately at the location of the center of the crop bale to be wrapped.

With the round bale press which is, for example, disclosed in EP 1 285 571 A1, which is hereby incorporated by reference in its entirety, an annular guide frame with one or two wrapping material carriers encloses a variable press chamber. Starting from such a wrapping device, the guide frame is pivotable about a horizontal axle which is situated parallel to the axis of rotation of the crop bale. A pivoting movement can be achieved in a structurally more simple and space-saving way than a translational movement. The pivoting movement makes it possible for the guide frame to be arranged near and even partly below the press chamber. A further advantage is achieved by the fact that any adjusting devices which are present can be used for the guide frame as this has to be pivotable into a transport position during unloading of the finished wrapped bale or also during non-operation. Translational height-adjustment devices for the guide frame are not suitable in this case, as overall the latter would have to be lifted to a significant extent in the vertical direction. If the wrapping device is situated downstream of a press chamber, a translational height-adjustment device for the guide frame makes it necessary to have an increased machine length, due to the required larger free space between the press chamber and wrapping device. The pivoting can also be achieved in an advantageous manner on coupled or pulled wrapping devices having one or more rotary arm(s).

Ideal wrapping conditions comprising a uniform overlapping distance of the webs of wrapping material are achieved if the axle is arranged approximately at the location of the center of the wrapping material for a medium-sized crop bale which is situated on the wrapping floor. As a result thereof, the wrapping material carrier remains almost concentric with the bale center in the required pivot angle range during its revolution.

The adjustment of the wrapping material centrally, at the location of the center of the crop bale, is achieved by the fact that the guide frame can be set to different angles of inclination with respect to the wrapping floor. One of ordinary skill in the art will appreciate that the floor comprises a conveying floor when it receives and rotates a bale, and a wrapping floor when a bale situated on the floor is being wrapped.

Expediently, the guide frame can be fixed in the wrapping position, so that it is at a constant distance from the conveying floor, while the guide frame is movable about its axis of rotation in a transport position, the movement being limited by a spring and/or damping means (e.g., damping mechanism).

As a result, an exact positioning during wrapping is ensured, while force and stress peaks during road transport at high speeds are prevented as a result of the resilient mounting.

According to a further feature of the invention, it is provided for the guide frame to have a ring or at least one rotary arm. The embodiment comprising a ring, in particular with a combination of a bale press and a wrapping device, makes advantageous, compact forms possible, while the embodiment with a rotary arm in solo operating mode of the wrapping device attached to a tractor or on wheels pulled by a tractor is advantageous.

In another embodiment of the present invention, it is provided that the guide frame is designed to be height-displaceable in a straight line in the vertical direction and at right angles to the wrapping floor and can be fixed at different distances to the wrapping floor.

In a further embodiment, it is provided that the guide frame can be adjusted by means of an adjusting device, depending on the diameter of the crop bales and/or of the width of the wrapping material.

In one embodiment, the actual diameters of the crop bales determined in a round bale press which is suitable for pressing differently sized bales are used as parameters for the adjustment of the guide frame, as these had already been required for controlling the press and are therefore already available.

In another embodiment of the invention, a control device is operatively connected to a sensor which determines the position of the guide frame and/or to a sensor which determines the width of the wrapping material. The control device can be fed desired values for the bale diameter in a simple manner or the desired values are, for example, automatically taken from the round bale press. From these values, the control device generates output signals for the adjusting device and causes an adjustment of the guide frame to the desired position. Similarly, the control device can be fed desired values for the width of the wrapping material or information about the width of the binding material is compiled by a suitable sensor and used for the adjustment.

With regard to the structure and the operation of a known round bale press with a variable press chamber and integrated wrapping device, reference can be made to European patent application No. EP 1 285 571 A1, for example, which is hereby incorporated by reference in its entirety.

BRIEF DESCRIPTION OF THE DRAWINGS

The features and advantages of the invention will be appreciated upon reference to the following drawings, in which:

FIG. 6 shows a diagrammatic representation of a third embodiment of a wrapping device according to the invention with a rotary arm.

DESCRIPTION OF ILLUSTRATIVE EMBODIMENTS

Figure 1:
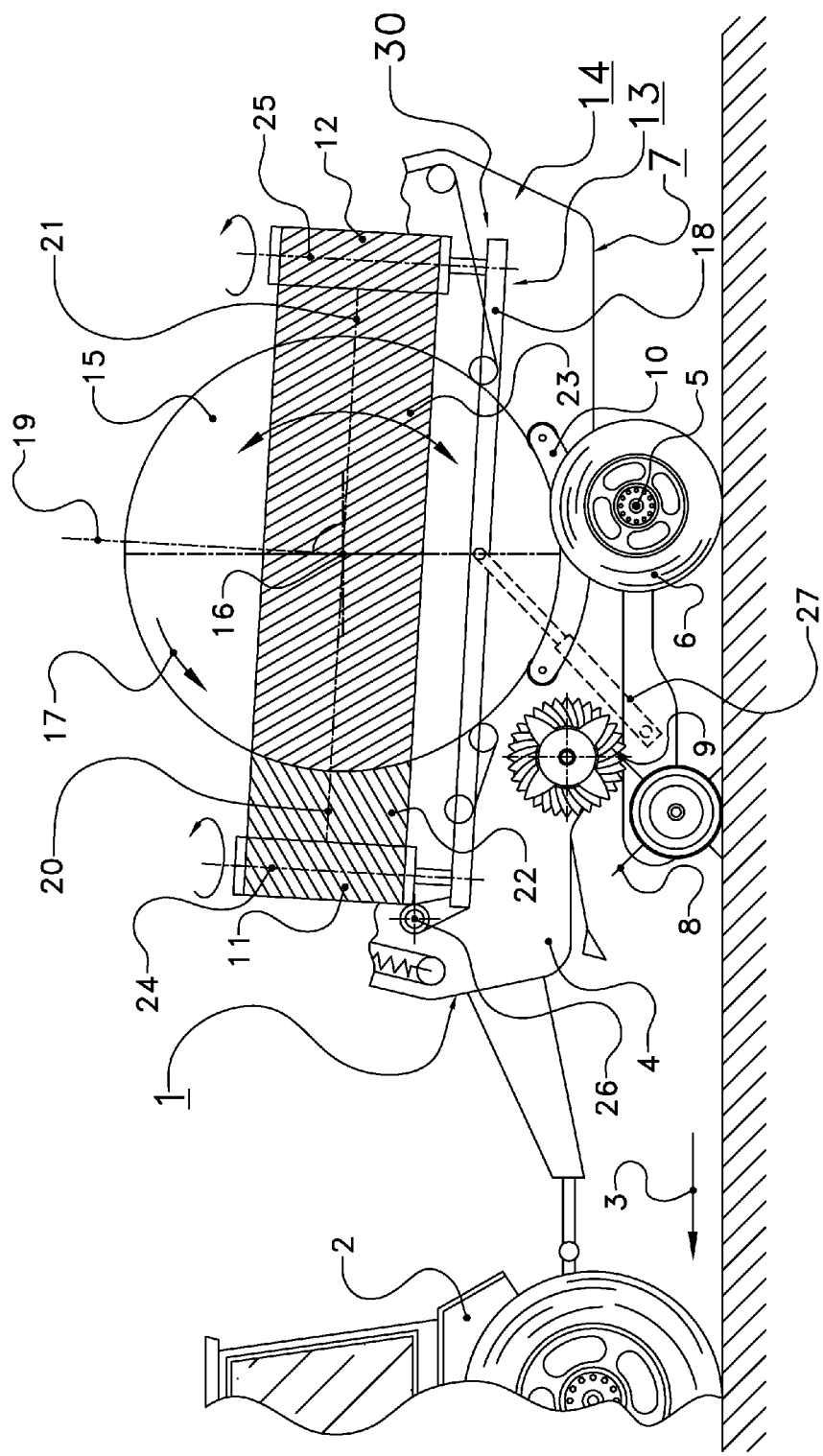
FIG. 1 shows an excerpt of a round bale press with a wrapping device according to the invention in a position of the guide frame at the largest possible bale diameter.

The following is a description of certain embodiments of the invention, given by way of example only and with reference to the drawings. FIG. 1 shows a round bale press 1 which is pulled in a direction of travel indicated by an arrow 3 by a tractor vehicle 2. Of this round bale press 1, FIG. 1 shows a frame 4 with a wheel axle 5 and wheels 6, the bottom part of a press arrangement 7, a collector 8, a conveying or cutting rotor 9 and a drivable conveying floor 10.

An upper, foldable part of the press arrangement, which may also be provided with sensors or other suitable means for determining the bale diameter, has been omitted for the sake of clarity. Above the conveying floor 10, a guide frame 13 provided with two wrapping material carriers 11,12 is arranged, which, together with the conveying floor 10 forms a wrapping device 14 for a finished pressed round bale 15 which is situated on the conveying floor 10, which forms an exemplary embodiment of the invention.

The drawing shows a round bale 15 with a maximum diameter, which can be rotated about a horizontal central axis 16 in the direction of the arrow 17 by means of a drive mechanism of the conveying floor 10.

The guide frame 13 comprises a preferably circular ring 18 with two wrapping material carriers 11, 12 which are displaced by 180° and which circle the bales 15 during the wrapping procedure about a vertical axle 19, which is arranged at right angles to the axis of rotation 16 of the round bale 15. With the round bale illustrated in FIG. 1, the ring 18 is in an approximately horizontal position. The position of the ring 18 is chosen such that the centers 20, 21 of the web of wrapping material 22, 23 are moved in a horizontal path around the round bale 15 at the location of the axis of rotation 16 of the round bale 15, and the distances from the axles 24, 25 of both wrapping material carriers 11, 12 to the center of the round bale are equal, as a result of which even overlapping is ensured during the wrapping of the round bale 15. At its front end, the ring 18 is pivotably mounted on the frame 4 about a horizontal axle 26 which is arranged parallel to the axis of rotation 16 of the round bale 15. A hydraulic cylinder is fitted between the frame 4 and the ring 18 as an adjusting device 27. The axle 26 is situated approximately at the location of the lower side of the web of wrapping material 22, 23, as far as possible outside the movement path of the wrapping material carriers 24, 25, so that round bales of different sizes take up a central position in the relatively small pivot angle area of the ring 18 with respect to the movement path of the wrapping material carriers 11, 12.

Figure 2:
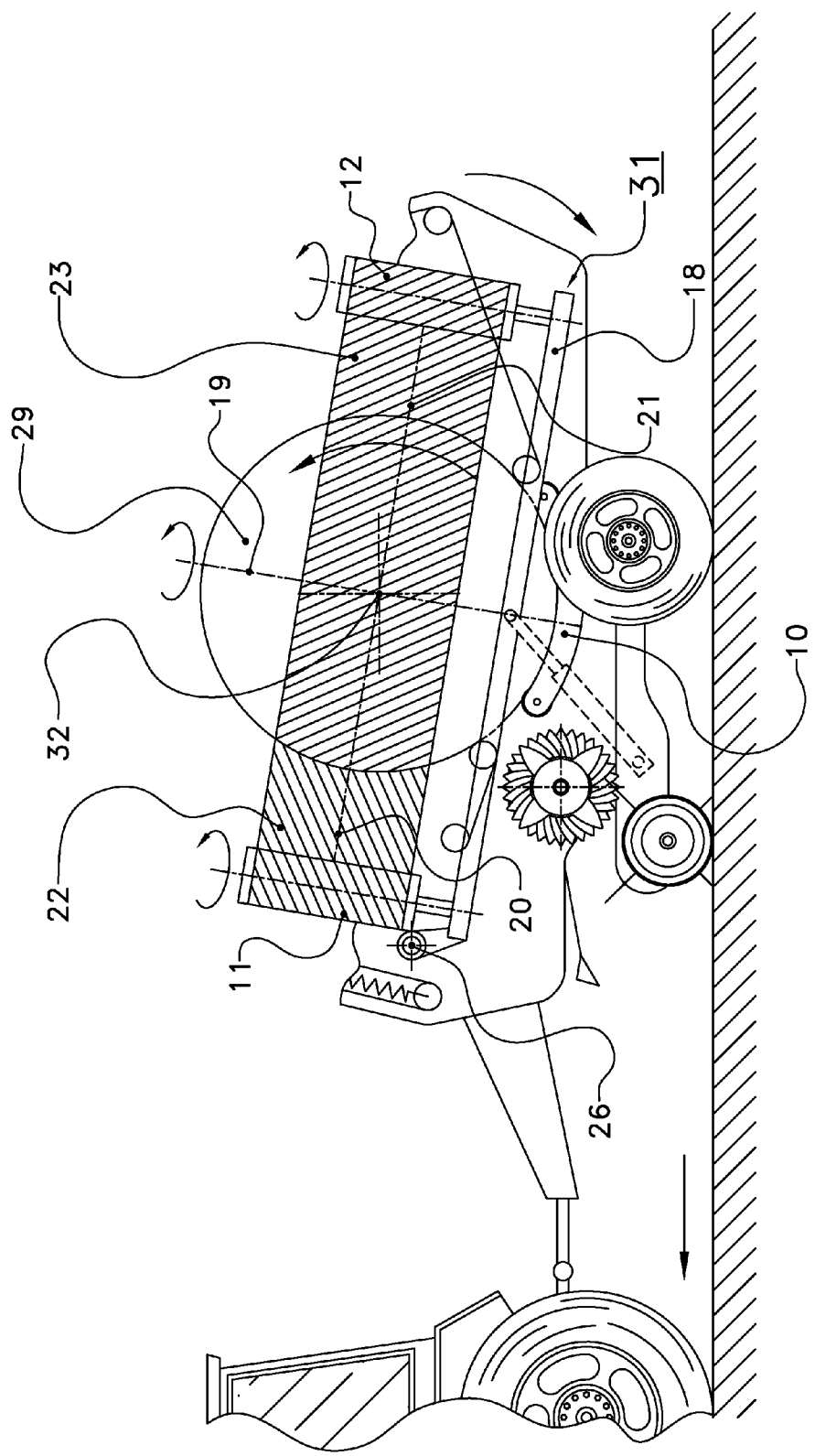
FIG. 2 shows a view according to FIG. 1 with the guide frame in a position for a medium-sized bale diameter.

In order to be able to wrap round bales having different diameters, the ring 18 can be set at a horizontal angle of inclination by means of an adjusting device 28 (see FIG. 3) so as to always position the centers 20, 21 of the web of wrapping material 22, 23 at the location of the axis of rotation of a round bale. FIG. 2 shows a round bale 29 of medium diameter during the wrapping process. Compared to the approximately horizontal position 30 shown in FIG. 1, the ring 18 now has an obliquely backwardly slanting position 31 and encloses a larger angle with the horizontal line. The upright of the wrapping material carriers 11, 12 which is at an angle to the vertical axle 19 of the movement path of the wrapping material carriers 11, 12 and the centers 20, 21 of the webs of wrapping material 22, 23 run through the axis of rotation 32 of the round bale 29.

Figure 3:
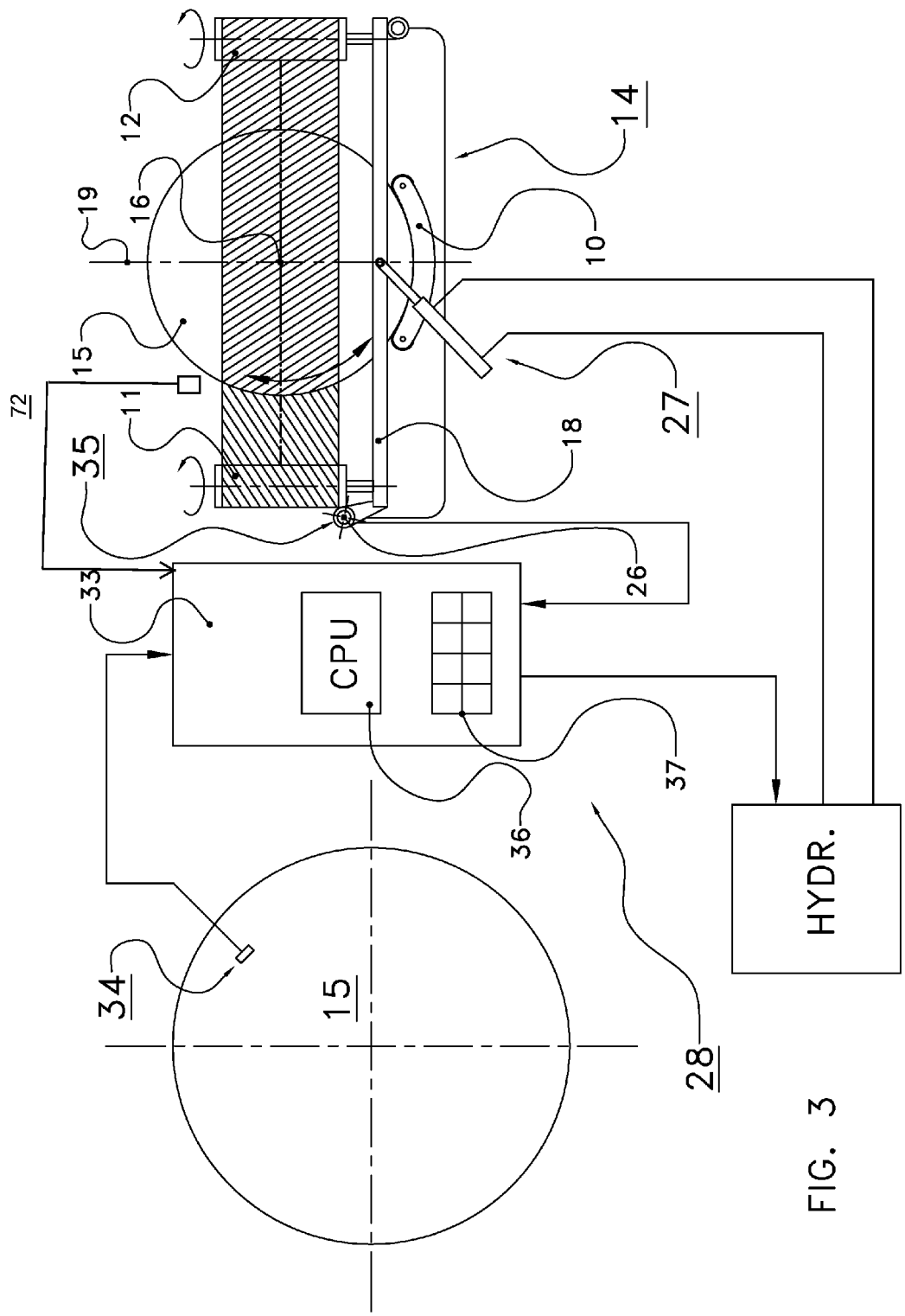
FIG. 3 shows a circuit diagram of an adjusting device of the guide frame.

In order to control the angle of inclination of the ring 18, the adjusting device 28 is provided with a control device 33—see the wiring diagram in FIG. 3—comprising a sensor 34 for the actual bale diameter, a sensor 35 for the actual position (angle of inclination) of the ring 18, a signal-processing unit 36, an input unit 37, a power supply and various connecting lines which ultimately have an effect on the adjusting device 27. The adjusting device 27 preferably comprises a double-acting hydraulic cylinder which is actuated by electromagnetic valves which are known per se.

It is advantageous if the sensor 34 for the actual bale diameter is mounted on the press 1, but it can also be mounted on the wrapping device 14. In the case of a round bale press with a constant bale forming chamber, this sensor can be omitted and the intended bale diameter and/or the width of the web of wrapping material can be input via the input unit, for example a control apparatus. A sensor 72 for determining the width of the web of wrapping material may also be provided.

The sensor 35 for the actual position (angle of inclination) of the ring 18 may, for example, consist of a rotation potentiometer which is fitted on the axle 26 of the ring 18. Alternatively, for example, a hydraulic cylinder with a path-measuring system can be used.

The signal-processing unit 36 is designed in the form of an on-board computer which is powered by the power source of the tractor vehicle 2 and which makes it possible to run computer programs and/or computing processes. The signal-processing unit 36 receives signals from the sensors 34, 35. A line runs from the signal-processing unit 36 to the adjusting device 27 by means of which the latter receives a signal for sliding in or sliding out, thus increasing or decreasing the distance between the conveying floor 10 and the ring 18.

With the example of a round bale press 1 having a variable bale forming chamber, the invention works as follows:

In order to carry out its operation, the round bale press 1 is driven onto a field using the tractor vehicle 2 and started up. The signal-processing unit 36 is activated and the desired bale diameter is set via the input unit 37. The sensor 35 then determines the angle of inclination of the ring 18 with respect to the horizontal line and the adjusting device 27 adjusts the angle of inclination of the ring 18 in accordance with the bale diameter input via the input unit 37. The same procedure is carried out for the width of the web of wrapping material. The round bale press 1 is pulled across a swathe of stalks by the tractor vehicle 2 and a round bale is pressed, the diameter of which increases as the supply of stalks increases. The sensor 34 for the actual bale diameter passes the ranges of the set bale diameter to the signal-processing unit 36 which compares this information to a desired value. Depending on the direction of the deviation, the adjusting device 27 is then pushed in or out in order to ensure that the actual value equals the desired value. At the same time, the supply of stalks is interrupted by stopping of the press 1 and the upper section (not shown) of the pressing device is lifted so far that the wrapping material carriers 11, 12 can rotate freely around the round bale 15. During the wrapping process, the wrapping material carriers 11, 12 and the round bale 15 rotate simultaneously, the wrapping material being taken from the wrapping material carriers 11, 12 and being wrapped around the round bale 15 using identical overlapping distances.

If, for example, at the end of the field, a small bale is produced using the remaining stalks, the sensor 34 passes this "small" bale diameter to the signal-processing unit 36. The latter then automatically adjusts the angle of inclination of the ring 18, so that the center of the web of wrapping material runs through the center of the smaller round bale during wrapping, thus ensuring perfect wrapping.

Figure 4:
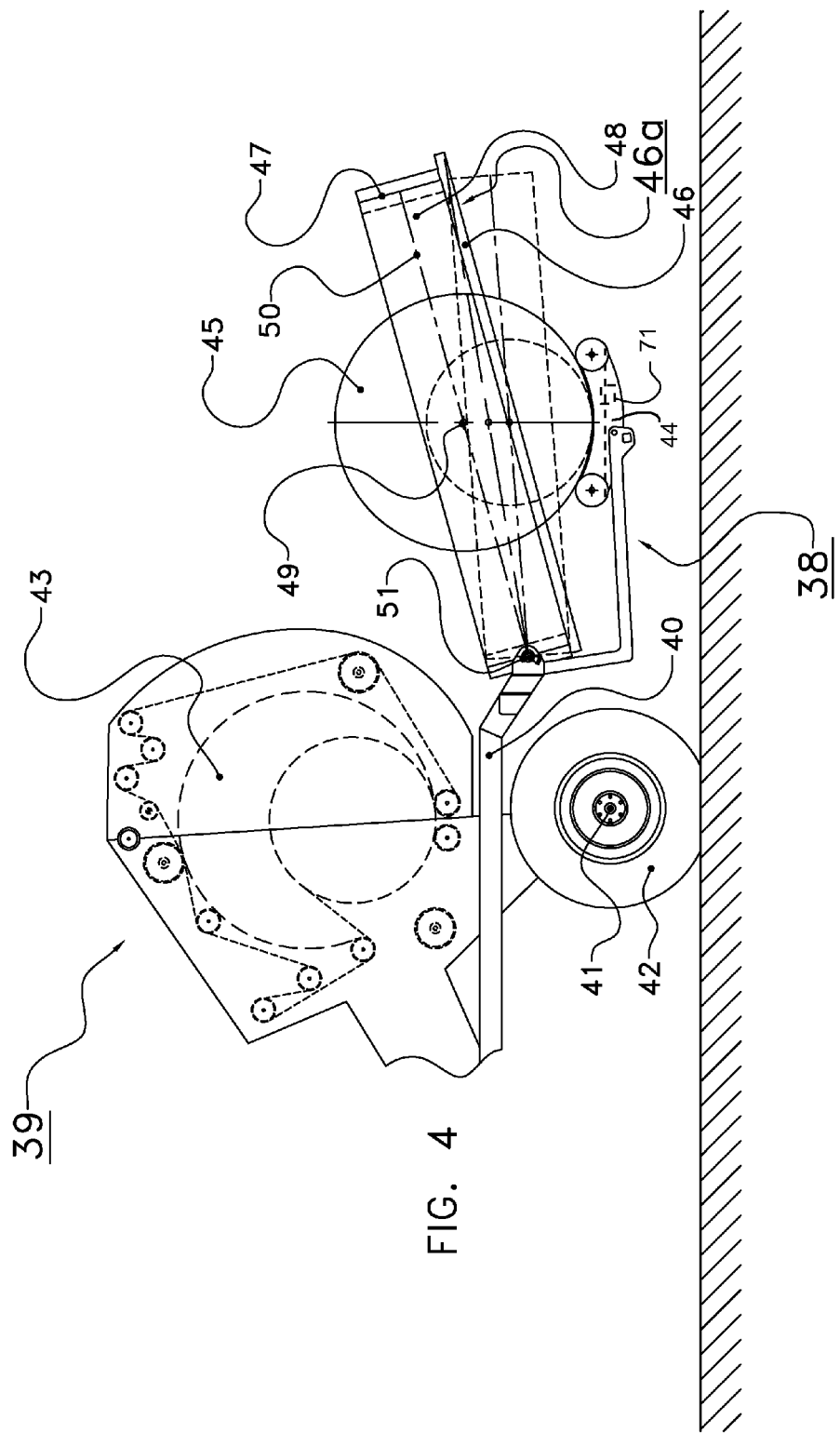
FIG. 4 shows a second embodiment of a wrapping device according to the invention, which is situated downstream of a round bale press with variable bale press chamber.

In another embodiment according to FIG. 4, the wrapping device 38 is arranged downstream of a round bale press 39. The round bale press 39 and the wrapping device 38 are supported by a support frame 40 which is provided with at least one wheel axle 41 having two wheels 42. The bale forming chamber 43 of the bale press 1 is adjustable in order to be able to press bales of different bale sizes. The wrapping device 38 has a wrapping floor 44 for receiving the pressed bale 45 and a guide frame 46 with at least one wrapping material carrier 47 in order to wrap the bale 45 which is on the wrapping floor 44 in a wrapping film/foil 48 in the form of webs. Viewed in the direction of travel, the wrapping floor 44 is situated behind the wheel axle 41 and approximately at the location of the wheel axle 41. The wrapping floor 44 is provided with a drive mechanism 71 for rotating the pressed bale 45 about a horizontal, central axis 49 which runs parallel to the wheel axle 41.

The guide frame 46 is preferably provided with a circular ring which, in a wrapping position 46a illustrated in FIG. 4, with the largest possible bale diameter, is arranged in an obliquely upwardly extending position with respect to the wheel axle 41. The position of the guide frame 46 with respect to the wrapping floor 44 is chosen in such a manner that, on the one hand, the bale 45 is positioned centrally with respect to the movement path of the wrapping material carrier 47 during the wrapping process and, on the other hand, the center 50 of the wrapping film/foil 48 runs at least approximately through the central axis 49 of the bale 45.

With this selected arrangement, round bales of a constant size can be wrapped perfectly and with a uniform overlap, without having to adjust the guide frame 46. In order to make the structure short, it may be expedient to move the guide frame 46 into a vertical transport position (not shown).

In order to be able to wrap bales of different diameters perfectly without height adjustment of the wrapping floor 44, the guide frame 46, via a rotary shaft 51 which is mounted at the end which is situated near the wheel axle 41, is pivotably mounted on the support frame 40. The rotary shaft 51 is mounted at the location of the center 50 of the wrapping film/foil 48, parallel to the central axis 49 of the bale 45, outside the orbit path of the wrapping material carrier 47.

Figure 5:
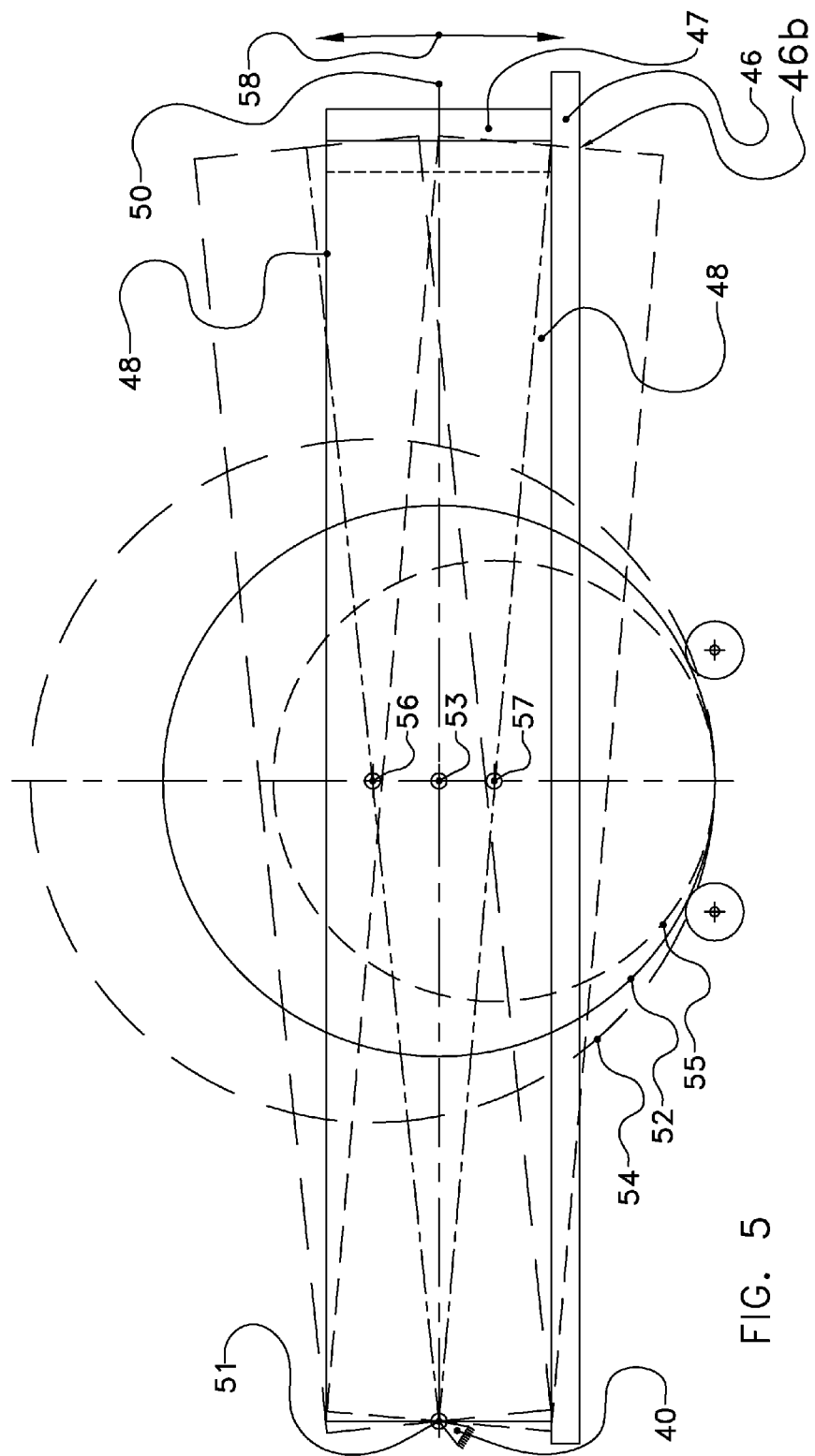
FIG. 5 shows an excerpt of a wrapping device according to the invention from FIG. 4 in a first position of the guide frame at the maximum bale diameter, a second position of the guide frame at a medium bale diameter and a third position at the smallest bale diameter.

By means of a solid line, a medium-sized bale 52 is shown with its axis of rotation 53 on the wrapping floor 44 in FIG. 5. The largest possible bale 54 and the smallest possible bale 55 are shown with their respective axes of rotation 56, 57, by means of broken lines. The height position of the rotary shaft 51 with respect to the wrapping floor 44 is chosen such that the center 50 of the wrapping film/foil 48 in the wrapping position 46b of the guide frame 46, illustrated by a solid line, runs through the axis of rotation 53 of the medium-sized bale 52. As a result of this choice, the concentricity of the wrapping material carrier 47 with respect to the center of the bale is maintained, both with a large bale 54 and with a small bale 55, despite a pivoting movement, see arrow 58, of the guide frame 46, which is advantageous for wrapping a bale with uniform overlap. The above-described adjusting device 28 illustrated in FIG. 3 similarly serves for the purpose of pivoting. Within the framework of the present invention, it is not only possible to envelop or package round bales, but also square bales.

In the embodiment of FIG. 6, the ring of the guide frame is replaced by a rotary arm.

A wrapping device 59 essentially consists of a wrapping floor 60 with drivable conveying elements 61 and a rotary arm 62, which is mounted on a bearing arm 64 so as to be rotatable about a vertical axle 63 and has a wrapping material carrier 65 at the bottom end. The bearing arm 64 and the wrapping floor 60 are supported on a machine frame 66 which can be attached to a tractor via coupling locations (not illustrated). Approximately at the location of the bale center axis 67 of a bale 68 with a medium diameter which is situated on the wrapping floor 60, the bearing arm 64 has a pivot bearing 69, the axis of which is arranged parallel to the center axis 67 of the bale. By means of an adjusting device 70, the upper bearing arm part 64a can be pivoted upwards and downwards with respect to the lower bearing arm part 64b which is fixed to the frame.

According to the above embodiments, the wrapping material can be aligned in each case with the location of the center of differently sized crop bales by simple pivoting of the upper bearing arm part 64a by means of the adjusting device 70, as a result of which enveloping with an even wrapping distance is ensured.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A wrapping device for at least one of enveloping and packing agricultural crop bales, the wrapping device comprising:
    a wrapping floor for receiving and rotating a pressed crop bale;
    a guide frame comprising a ring and at least one wrapping material carrier, for enveloping the bale situated on the wrapping floor with wrapping material in the form of webs; and
    a control device,
    wherein the guide frame is height adjustable and pivotable about a horizontal axle which runs parallel to the axis of rotation of the crop bale, and
    wherein the control device is configured to adjust an angle of inclination of the ring and to pivot the guide frame about a horizontal axle which runs parallel to the axis of rotation of the crop bale to set the center of the wrapping material approximately at the location of the center of the crop bale, during wrapping the bale.

2. The wrapping device of claim 1, wherein the angle of inclination of the ring is adjusted based on a size of the crop bale.

3. The wrapping device of claim 1, wherein two wrapping material carriers are displaced substantially at two ends of a diameter of the ring, and are configured to circle the crop bale about a second axle substantially perpendicular to the axis of rotation of the crop bale.

4. The wrapping device of claim 2, wherein the angle of inclination of the ring is adjusted to position the centers of the wrapping material on both sides of the diameter of the ring at the location of the axis of rotation of the crop bale.

5. The wrapping device of claim 1, wherein the horizontal axle is arranged approximately at the location of the center of the wrapping material for a crop bale which is situated on the wrapping floor.

6. The wrapping device of claim 1, wherein actual diameters of the crop bales determined in a round bale press which is suitable for pressing differently sized bales, and wherein the determined diameters are used as parameters for the adjustment of the angle of inclination.

7. The wrapping device of claim 1, wherein the guide frame is adjustable by an adjusting device, depending on at least one of: a diameter of the crop bale and a width of the wrapping material.

8. The wrapping device according to claim 7, wherein the control device is directly or indirectly operatively connected to a sensor that determines the bale diameter, and to a sensor that determines a width of the wrapping material.

9. The wrapping device according to claim 7, wherein the adjusting device is configured to determine the position of the guide frame.

10. The wrapping device according to claim 1, wherein the guide frame with the wrapping material carrier is rotatable by a motor, or that at least one wrapping material carrier is mounted in or on the guide frame so as to be displaceable by the motor.

11. The wrapping device according to claim 1, wherein the wrapping floor is arranged downstream of a bale press, wherein the guide frame is adjustable about a rotary shaft which is arranged on the end situated near the bale press.

12. The wrapping device according claim 1, wherein the guide frame is movably placed around the bale forming chamber of a bale press and encloses the latter, wherein the bale forming chamber floor or a part thereof is configured as the wrapping floor.

13. A wrapping device for at least one of enveloping and packing agricultural crop bales, the wrapping device comprising:
    a wrapping floor for receiving and rotating a pressed crop bale;
    a guide frame comprising at least one wrapping material carrier for enveloping the bale situated on the wrapping floor with wrapping material in the form of webs; and
    a control device,
    wherein the guide frame is height adjustable and pivotable about a horizontal axle which runs parallel to the axis of rotation of the crop bale, and
    wherein the control device is configured to adjust an angle of inclination of the at least one wrapping material carrier, based on determination of bale diameter and/or width of wrapping material, and to pivot the guide frame about a horizontal axle which runs parallel to the axis of rotation of the crop bale to set the center of the wrapping material approximately at the location of the center of the crop bale during wrapping the bale.

14. The wrapping device of claim 13, wherein the control device is configured to adjust the angle of inclination of the at least one wrapping material carrier such that concentricity of the wrapping material carrier with respect to the center of the bale is maintained.

15. The wrapping device of claim 13, wherein the horizontal axle is arranged approximately at the location of the center of the wrapping material for a crop bale which is situated on the wrapping floor.

16. The wrapping device of claim 13, wherein the guide frame is adjustable by an adjusting device, depending on at least one of: a diameter of the crop bale and a width of the wrapping material.

17. The wrapping device according to claim 13, wherein the control device is directly or indirectly operatively connected to a sensor that determines the bale diameter, and to a sensor that determines a width of the wrapping material.

18. The wrapping device according to claim 13, wherein the guide frame with the wrapping material carrier is rotatable by a motor, or that at least one wrapping material carrier is mounted in or on the guide frame so as to be displaceable by the motor.

19. The wrapping device according to claim 13, wherein the wrapping floor is arranged downstream of a bale press, wherein the guide frame is adjustable about a rotary shaft which is arranged on the end situated near the bale press.

20. The wrapping device according claim 13, wherein the guide frame is movably placed around the bale forming chamber of a bale press and encloses the latter, wherein the bale forming chamber floor or a part thereof is configured as the wrapping floor.

\* \* \* \* \*